(12) United States Patent  
Tanaka et al.

(10) Patent No.: US 7,913,577 B2
(45) Date of Patent: Mar. 29, 2011

(54) FLOW METER (75) Inventors: Shogo Tanaka, Nagano (JP); Tetsuhiko Hara, Nagano (JP)

(73) Assignee: Nidec Sankyo Corporation (JP)

( * ) Notice: Subject to any disclaimer, the term of this patent is extended or adjusted under 35 U.S.C. 154(b) by 142 days.

(21) Appl. No.: 12/463,662

(22) Filed: May 11, 2009

(65) Prior Publication Data

US 2009/0277280 A1    Nov. 12, 2009

(51) Int. Cl.
*G01F 15/00* (2006.01)

(52) U.S. Cl. ...................................... 73/861.77; 439/190

(58) Field of Classification Search ............... 73/861.77, 73/861.78; 439/660, 190
See application file for complete search history.

(56) References Cited

U.S. PATENT DOCUMENTS

| | | | | |
|---|---|---|---|---|
| 4,829,833 A | * | 5/1989 | Feller | 73/861.77 |
| 5,575,692 A | * | 11/1996 | Cecil et al. | 439/752 |
| 5,967,859 A | * | 10/1999 | Cecil et al. | 439/752 |
| 6,010,370 A | * | 1/2000 | Aihara et al. | 439/660 |
| 2006/0010975 A1 | | 1/2006 | Pluess | |

* cited by examiner

*Primary Examiner* — Jewel Thompson
(74) *Attorney, Agent, or Firm* — Cantor Colburn LLP (57) ABSTRACT

A flow meter may include a case body formed with a fluid space in its inside, an impeller disposed in the fluid space, a detected part integrally provided in the impeller, a detecting part provided with detecting terminals for detecting the detected part, terminal pins which is provided with terminal contact parts, which are electrically connected with the detecting terminals of the detecting part, and connector parts with which a connector for outputting an electric signal to an outside is connected, and a holder to which the terminal pins are fixed and which is detachably held by the case body through a holder holding part provided in the case body. The detecting part and the terminal contact parts are held between the case body and the holder by attaching the holder to the case body so that the terminal contact parts are contacted with the detecting terminals.

20 Claims, 5 Drawing Sheets

FLOW METER

CROSS REFERENCE TO RELATED APPLICATION

The present invention claims priority under 35 U.S.C. §119 to Japanese Application No. 2008-123371 filed May 9, 2008, the entire contents of which are incorporated herein by reference.

FIELD OF THE INVENTION

An embodiment of the present invention may relate to a flow meter, more specifically, relate to a flow meter which measures flow quantity of fluid passing through a fluid space by measuring a rotation number of an impeller that is disposed in the fluid space.

BACKGROUND OF THE INVENTION

A flow meter has been known in which an impeller is disposed in a fluid space and flow quantity of fluid passing through the fluid space is measured by measuring a rotation number of the impeller. The rotation number of the impeller is measured by means of that a detected part fixed to the impeller is detected by a detecting part. The flow meter includes a connector part to which a connector for electrically connecting an outside control section to the detecting part is connected.

Various structures of the connector part have been disclosed. For example, in US 2006/0010975 A1, a structure is disclosed in which terminal pins are provided through a holder (plug part) perpendicularly to a case (cover) to be abutted with terminals of the detecting part and electrically connected with each other.

However, there are following problems in the structure described in the above-mentioned Patent Reference. In other words, since the terminal pins are perpendicularly press-fitted and fixed to the holder, for example, when the connector is pulled off, the terminal pins may be separated from the terminals of the detecting part to disconnect their electric conduction.

Further, as shown in FIG. 3 in the Patent Reference, since the terminal pins and the terminals of the detecting part are abutted with each other in a radial direction of the impeller, a size in the radial direction of the entire flow meter is larger.

Further, in the flow meter described above, trouble or damage of the detecting part or the like may occur due to leakage of fluid from an inflow port, an outflow port or the like, and dew condensation or the like due to temperature change. In this case, in the structure where the holder is locked at two positions like the above-mentioned Patent Reference, detaching of the holder is difficult and thus the detecting part is not speedily replaced.

SUMMARY OF THE INVENTION

In view of the problems described above, at least an embodiment of the present invention may advantageously provide a flow meter in which reliability of electric connection of a terminal pin with a detecting part is improved, a size of the entire product is compact, and maintenance performance is superior.

According to at least an embodiment of the present invention, there may be provided a flow meter including a case body which is formed with a fluid space in an inside of the case body, an impeller which is disposed in the fluid space and whose rotation number is varied according to flow quantity of fluid flowing through the fluid space, a detected part which is integrally provided in the impeller, a detecting part which is provided with detecting terminals for detecting the detected part to convert into an electric signal, terminal pins which is provided with terminal contact parts, which are electrically connected with the detecting terminals of the detecting part % and connector parts with which a connector for outputting the electric signal converted by the detecting part to an outside is connected, and a holder to which the terminal pins are fixed and which is detachably held by the case body through a holder holding part provided in the case body. The detecting part and the terminal contact parts are held between the case body and the holder so that the terminal contact parts are contacted with the detecting terminals by attaching the holder to the case body.

According to the flow meter in this embodiment, the terminal contact part which structures the terminal pin is contacted with the detecting terminal in a state that the detecting part and the terminal contact part are held between the case body and the holder. Therefore, electric conduction between the terminal pin and the detecting terminal is prevented from being disconnected by fitting-to and pulling-off of a connector. Further, since a part of the terminal pin (terminal contact part) is located between the holder and the case body, the size of the entire flow meter is reduced even though the terminal pin is protruded outside. In addition, since the detecting part is held between the case body and the holder which is detachably attached to the case body, even when trouble or damage may occur in the detecting part the detecting part is easily replaced and thus maintenance performance is superior.

In accordance with an embodiment of the present invention, the terminal contact part and the detecting terminal are respectively formed in a shape extending in a longitudinal direction, and side faces in the longitudinal direction of the terminal contact part and the detecting terminal are abutted with each other. According to this structure, contacting area of the terminal contact part with the detecting terminal becomes larger and thus reliability of electrical connection of the terminal pin with the detecting part is improved. Further, since stress applied to the detecting terminal by the terminal contact part becomes smaller, damage and the like of the detecting terminal can be prevented.

In accordance with an embodiment of the present invention, the side faces in the longitudinal direction of the terminal contact part and the detecting terminal are faced and abutted with each other in an axial direction of the impeller. According to this structure, the size of the flow meter is reduced.

In accordance with an embodiment of the present invention, the terminal pin is structured so that the connector part and the terminal contact part are connected to each other at a substantially right angle, and the connector part is penetrated through the holder. According to this structure, since movement of the terminal pin in the longitudinal direction of the connector part is restricted by the holder, electric conduction between the terminal pin and the detecting terminal is not disconnected by fitting-to and pulling-off of the connector.

In accordance with an embodiment of the present invention, an inflow port is provided in the case body so that fluid is flowed into the fluid space in the case body, and an outflow port is provided in the case body so that the fluid is flowed out from the fluid space, and the holder holding part is provided on a face which is different from a face where the inflow port and the outflow port are provided. According to this structure, the inflow port and the outflow port provided in the case body do not interrupt attaching and detaching operation of the holder to and from the case body and thus maintenance of the flow meter can be performed speedily.

In accordance with an embodiment of the present invention, the detecting terminal is urged toward the terminal contact part by an urging member which is disposed in the case body. In this case, it is preferable that the detecting terminal is engaged with a groove part which is provided on at least one of the case body and the urging member disposed on the case body. According to this structure, a sure contact state of the detecting terminal with the terminal contact part is obtained and thus their electric connecting state is satisfactory.

Further, in accordance with an embodiment of the present invention, the terminal contact part is urged toward the detecting terminal by an urging member which is disposed on the holder. In this case, it is preferable that the terminal contact part is engaged with a groove part which is provided on at least one of the holder and the urging member disposed on the holder. According to this structure, a sure contact state of the detecting terminal with the terminal contact part is obtained and thus their electric connecting state is satisfactory.

Further, in accordance with an embodiment of the present invention, when the holder is attached to the cover body, the terminal contact part of the terminal pin which is fixed to the holder is pressed against the detecting terminal of the detecting part, and the terminal contact part and the detecting terminal are held between a side face of the case body and a side face of the holder so that the side faces in the longitudinal direction of the terminal contact part and the detecting terminal are faced and abutted with each other. According to this structure, since stress applied to the terminal contact part and the detecting terminal is smaller, damage or the like of the terminal contact part and the detecting terminal can be prevented.

Further, in accordance with an embodiment of the present invention, the holder holding part includes a first holder holding part and a second holder holding part, and the holder is provided with a support part which is turnably supported by the first holder holding part and an engaging part which is engaged with the second holder holding part. According to this structure, since the portion where the holder is engaged with the case body is one position, attaching and detaching of the holder to and from the case body is easy.

In this case, it is preferable that the connector part is located at a position which is nearer to the support part than the engaging part. A load is commonly applied to the connector part (terminal pin) when the connector is fitted to and pulled off the connector part. However, according to this embodiment, since the connector part is located on the support part side where an engaging force of the holder with the case body is larger, damage or the like of the holder to which the terminal pin is fixed is prevented.

Further, it is preferable that the terminal contact part is located at a position which is nearer to the support part than the engaging part. According to this embodiment, rattling is smaller at a position of the support part as a supporting point for attaching and detaching the holder and thus rattling of the terminal contact part held between the holder and the case body is made smaller.

Further, in accordance with an embodiment of the present invention, a guide rail with which the holder is engaged is formed on the case body in the longitudinal direction of the terminal contact part and the detecting terminal that are abutted with each other, and side faces in the longitudinal direction of the terminal contact part and the detecting terminal are faced and abutted with each other by attaching the holder to the case body along the guide rail. According to this embodiment, since the holder is attached to the case body by sliding, attaching and detaching operation is easy. Further, when the holder is made slide, the terminal contact part of the terminal pin fixed to the holder and the detecting terminal are scraped with each other and thus metal films of the terminal contact part and the detecting terminal are removed and their satisfactory electric conduction state are obtained.

Further, a magnet may be used as the detected part and a Hall IC may be used as the detecting part. According to this structure, the detected part and the detecting part are structured to be inexpensive and thus cost of the flow meter can be reduced. Further, in comparison with a case that an optical sensor or the like is used, even when fluid to be measured is not transparent, a high degree of measuring accuracy can be obtained.

Further, in accordance with an embodiment of the present invention, a plurality of inflow passages is formed in the fluid space for guiding the fluid to the impeller, and an angle between one of the inflow passages and an adjacent inflow passage is 180 degrees or less. As described above, the inflow passages may be provided on the circumference of the impeller in a well balanced manner and thus uneven force with which the impeller is received from the fluid is reduced and, as a result, damage, abrasion or the like of the impeller and the impeller shaft supporting the impeller are prevented.

Further, in accordance with an embodiment of the present invention, the impeller makes the fluid which is flowed from the inflow passage flow out in a direction of a rotational axis of the impeller. According to this structure, the impeller is rotated in an urged state in either direction of the axial direction by the fluid pressure and thus raffling during rotation of the impeller is restrained and the flow meter whose noise is reduced can be obtained. Further, when the impeller is urged in the axial direction toward the detecting part for detecting the detected part, a detecting state by the detecting part for the detected part, which is integrally provided in the impeller, is stable.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A flow meter in accordance with an embodiment of the present invention will be described below with reference to the accompanying drawings.

Figure 1:
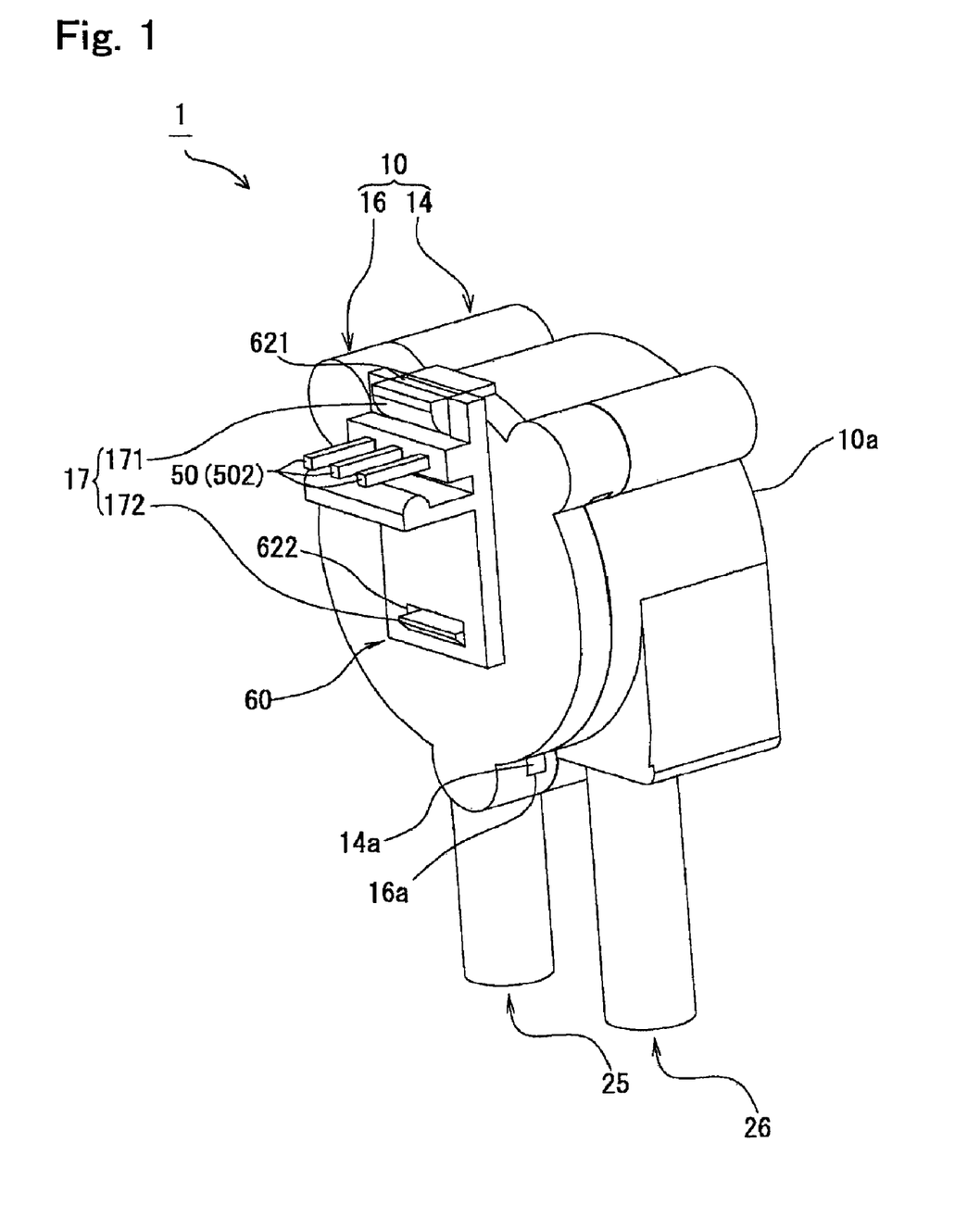
FIG. 1 is an appearance perspective view showing a flow meter in accordance with a first embodiment of the present invention.
Figure 2:
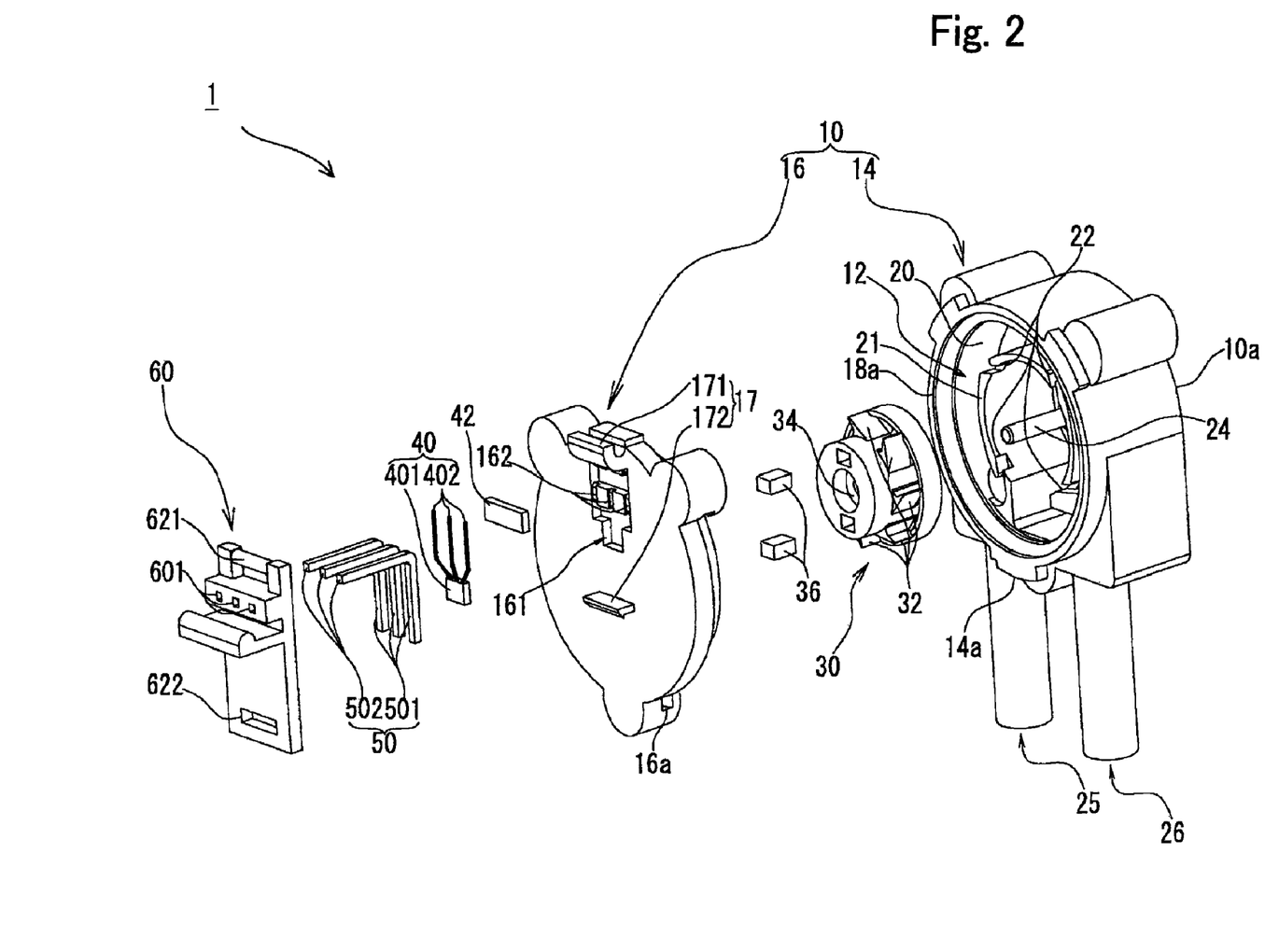
FIG. 2 is an exploded perspective view showing the flow meter in FIG. 1.
Figure 3:
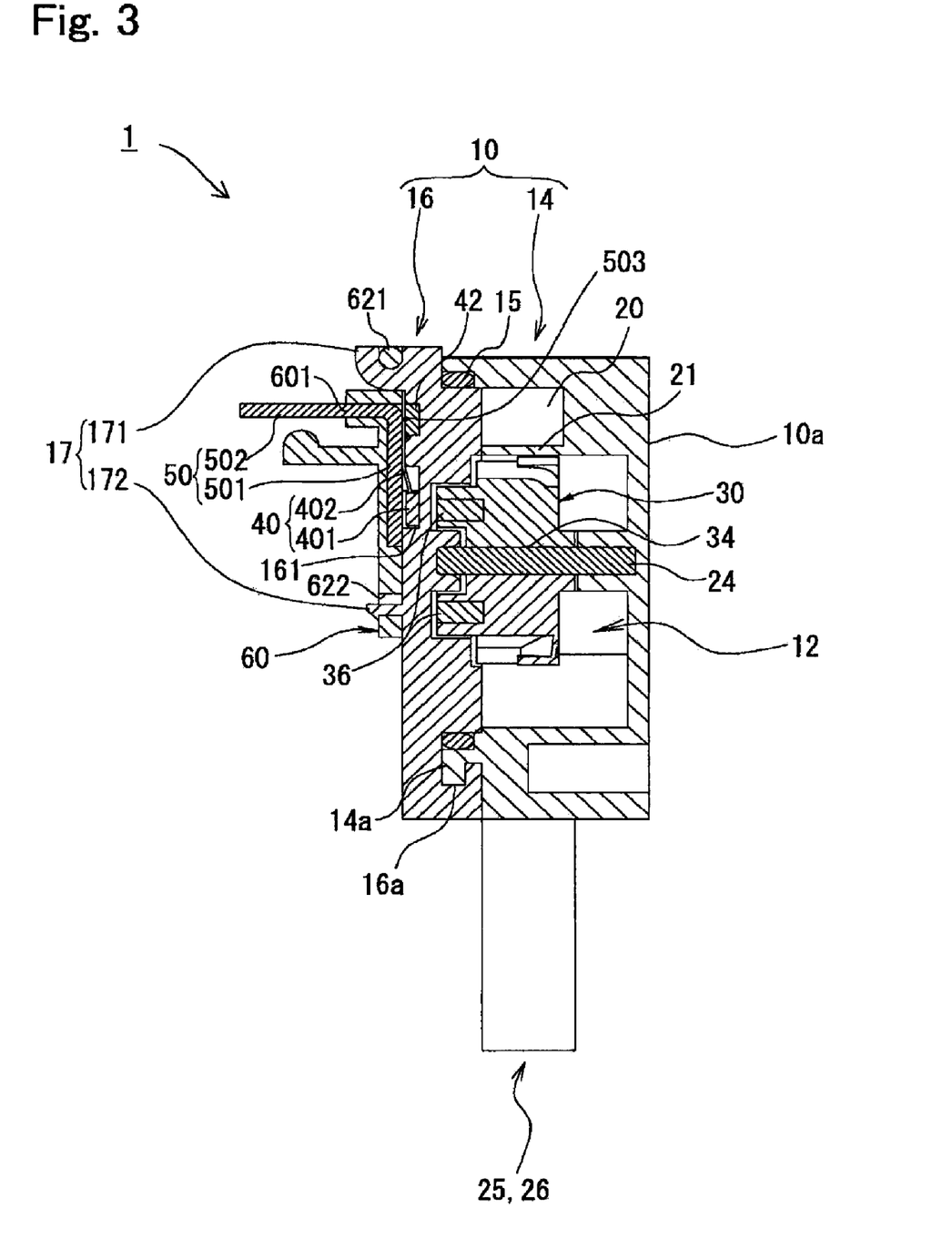
FIG. 3 is a sectional view showing the flow meter in FIG. 1.

FIG. 1 is an appearance perspective view showing a flow meter 1 in accordance with a first embodiment of the present invention. FIG. 2 is an exploded perspective view showing the flow meter 1 and FIG. 3 is a sectional view showing the flow meter 1. The flow meter 1 includes a case body 10 which is formed with a fluid space 12 in its inside, an impeller 30 which is disposed in the fluid space 12, a detecting part 40 for detecting a rotation number of the impeller 30, terminal pins 50 which are electrically connected with the detecting part 40 for inputting and outputting an electric signal to and from the detecting part 40, and a holder 60 to which the terminal pins 50 are fixed. The flow meter 1 in accordance with this embodiment is used for drink supplying or beverage feeding.

The case body 10 is structured of a case main body 14 and a cover body 16 which are made of resin. The case main body 14 is formed with the fluid space 12 which is a recessed portion having a predetermined size. A partition wall 21 is formed in the fluid space 12 for forming a flow passage 20 of fluid flowing into the fluid space 12. In this embodiment, the partition wall 21 is formed with inflow passages 22. The inflow passages 22 are preferably formed so that an angle between one inflow passage and an adjacent inflow passage is set to be 180 degrees or less in order to prevent a load to the impeller 30 from becoming excessive, and more preferably, the inflow passages 22 are formed with equal intervals in a circumferential direction.

An impeller shaft 24 is formed so as to protrude from a center of a bottom face of the recessed portion which is the fluid space 12. As shown in FIG. 3, the impeller 30 is rotatably supported by the impeller shaft 24.

One side face of the case main body 14 is formed with an inflow port (inflow path) 25 and an outflow port (outflow path) 26 which are in communication with the fluid space 12. The impeller 30 is fitted to the impeller shaft 24 and the cover body 16 is attached to the case main body 14 and, as a result, an aperture 18a of the fluid space 12 is sealed. In this manner, the fluid space 12 in which the impeller 30 is arranged is formed as a sealed space except the inflow port 25 and the outflow port 26.

An opposite face to the fluid space 12 side of the cover body 16 is formed with a holder holding part 17 comprised of a first holder holding part 171 and a second holder holding part 172 on which a holder 60 is detachably mounted. Details of its shape and mounting structure of the holder 60 will be described below.

A face of the case body 10 which is an opposite side to the side where the cover body 16 is fitted is a mounting face 10a of the flow meter 1. According to this structure, the cover body 16 can be detached in a state that the flow meter 1 is mounted and thus its maintenance performance is superior.

In this embodiment, as shown in FIG. 3, an O-ring 15 is disposed between the case main body 14 and the cover body 16 in order to enhance its sealing property. Further, the cover body 16 is attached to the case main body 14 by means of that an engaging projection 14a of the case main body 14 is engaged with an engaging groove 16a of the cover body 16. In other words, the cover body 16 is turned so as to correspond to the aperture 18a to make the engaging projection 14a engage with the engaging groove 16a. However, this structure is only one example and appropriate modifications may be applied. For example, the cover body 16 may be clamped to the case main body 14 by a bolt or the like.

The impeller 30 is provided with an outer peripheral face in a cylindrical shape and is formed with a plurality of blades 32 on the outer peripheral face. A bearing hole 34 is formed at its center and an impeller shaft 24 is inserted into the bearing hole 34. In this manner, the impeller 30 is rotatably supported in the fluid space 12. Further, an end face of the impeller 30, i.e., an end face located on the cover body 16 side when the impeller 30 is mounted, is fixed with the detected part 36. In this embodiment, a magnet is used as the detected part 36, which is provided at two positions in a symmetric manner with respect to a plane passing through an axis line of the impeller 30.

The detecting part 40 is structured of a detecting main body 401 and detecting terminals 402. The detecting main body 401 senses the detected part 36 which is fixed to the impeller 30 to convert rotation of the impeller into an electric signal. In this embodiment, a Hall IC is used as the detecting main body 401 because it is easy to obtain and inexpensive.

As shown in FIG. 3, the detecting main body 401 is disposed in a recessed part 161 which is formed in the cover body 16 (case body 10) so that a distance between a center of the detecting part main body 401 and an axial line of the impeller shaft 24 is set to be equal to a distance between a center of the detected part 36 and the axial line of the impeller shaft 24. Therefore, the detected part 36 is detected by the detecting main body 401 whenever the impeller 30 is rotated by 180 degrees. A signal detecting the detected part 36 is outputted to an outside control section for controlling the flow meter 1 and a rotation number of the impeller 30, i.e., flow quantity of fluid which flows through the fluid space 12, is measured.

The detecting terminal 402 is an output terminal formed in a linear wire shape for outputting the signal outside and, in this embodiment, the detecting part 40 includes three detecting terminals 402 (for electric signal output, for power supply, and for ground connection). The detecting terminals 402 are extended in a direction perpendicular to the axial line of the impeller shaft 24.

The terminal pin 50 is an "L"-shaped metal member which is electrically connected with the detecting terminal 402. The terminal pin 50 is provided with a terminal contact part 501 and a connector part 502, both of which are formed in a straight bar shape. The terminal contact part 501 is a bar-shaped portion extending in a longitudinal direction whose side face is abutted with the side face of the wire-shaped detecting part terminal 402 of the detecting part 40 in the longitudinal direction. In other words, the terminal contact part 501 is extended in a direction perpendicular to the axial line of the impeller shaft 24 when the holder 60 is attached to the cover body 16 (case body 10). The connector part 502 is a bar-shaped portion which is connected to a connector not shown for electrically connecting the flow meter 1 with its control section.

The holder 60 is a member which holds the detecting part 40 between the case body 10 (cover body 16) and the holder 60 to make the terminal contact parts 501 of the terminal pins 50 abut with the detecting terminals 402 of the detecting part 40. The holder 60 is provided with a support shaft 621 as a support part, which is supported by a first holder holding part 171 that is formed on the cover body 16, and an engaging hole 622 as an engaging part which is engaged with a second holder holding part 172 formed on the cover body 16. The holder 60 is detachably attached to the cover body 16 (case body 10). Further, the holder 60 is fixed with the terminal pins 50 which are electrically connected to the three detecting terminals 402 respectively. Specifically, the holder 60 is formed with three through holes 601 and the connector parts 502 of the terminal pins 50 are press-fitted to the respective through holes 601 and, in this manner, the terminal pins 50 are fixed to the holder 60. As shown in FIGS. 1 and 3, the connector parts 502 which are press-fitted into the through holes 601 are penetrated through the holder 60 to protrude outside.

As shown in FIG. 3, the first holder holding part 171 formed on the cover body 16 is formed in a "U"-shape in cross section so as to open in an upward direction. The second holder holding part 172 is a pawl part which is elastically deformable. The holder 60 is attached to the cover body 16 (case body 10) so that the support shaft 621 is engaged with the first holder holding part 171 and the pawl part of the second holder holding part 172 is engaged with the engaging hole 622.

As shown in FIG. 3, when the holder 60 is attached to the cover body 16 (case body 10), the detecting part 40 which is disposed in the recessed part 161 of the cover body 16 is held between the holder 60 and the cover body 16 (case body 10). Further, the terminal contact parts 501 of the terminal pins 50 fixed in the holder 60 are pressed against the detecting terminals 402 of the detecting part 40 to abut with each other in a tightly contacted state. In this embodiment, the terminal contact part 501 and the detecting terminal 402 are structured so as to abut with each other in a mutually parallel manner, that is, so that respective side faces in the longitudinal direction are abutted with each other. According to this structure, a contacting area of the terminal contact part 501 with the detecting terminal 402 becomes larger and thus disconnection or the like of the terminal contact part 501 with the detecting terminal 402 is prevented. Further, a stress applied to the detecting terminal 402 by the terminal contact part 501 becomes smaller and thus disconnection or the like due to damage of the detecting terminal 402 is prevented.

Further, the abutting parts of the terminal contact part 501 and the detecting terminal 402 are structured so as to face and abut with each other in the axial direction of the impeller shaft 24. In addition, the detecting terminals 402 are linearly extended from the detecting part 40. Therefore, the detecting terminal 402 is not required to be bent largely.

In this embodiment, an elastic sheet 42 (corresponding to an urging member) which is formed of elastic and insulating material such as rubber is disposed on the cover body 16 at a position where the detecting terminals 402 are placed. The detecting terminals 402 are urged and pressed in a direction of the terminal contact parts 501 by the elastic sheet 42. Therefore, contacting state of the detecting terminal 402 with the terminal contact part 501 is surely maintained and thus their electrical connecting state is stable.

In accordance with an embodiment, the elastic sheet 42 may be provided on the terminal contact part 501 side. In other words, an elastic sheet similar to the above-mentioned embodiment may be disposed between the holder 60 and the terminal contact part 501 to urge the terminal contact part 501 toward the detecting terminal 402 side. According to this embodiment, similar effects are also obtained. Further, when the elastic sheet urging the detecting terminal 402 toward the terminal contact part 501 and the elastic sheet urging the terminal contact part 501 toward the detecting terminal 402 are used together, the above-mentioned effects are further enhanced.

In a case that the above-mentioned elastic sheet 42 is not used, when the detecting terminal 402 or the terminal contact part 501 is provided with elasticity in itself, similar effects as described above are obtained. Specifically, for example, at least one of the detecting terminal 402 and the terminal contact part 501 is structured of elastic material.

Further, as shown in FIG. 2, the cover body 16 is formed with groove parts 162. The detecting part 40 is mounted on the cover body 16 so that the detecting terminals 402 are respectively fitted to the groove parts 162. In this manner, the detecting terminal 402 and the terminal contact part 501 are surely contacted with each other.

In accordance to an embodiment of the present invention, the groove part 162 may be formed on the elastic sheet 42. Alternatively, when the groove parts into which the terminal contact parts 501 are fitted may be formed on the holder 60 or the elastic sheet provided on the holder 60, similar effects as described above are obtained.

A connector not shown is fitted to and pulled off the connector parts 502 which are protruded outside from the holder 60. In this embodiment, when the holder 60 is attached to the cover body 16, the terminal contact parts 501 of the terminal pins 50 which are formed in an "L"-shape are sandwiched between the holder 60 and the cover body 16 (case body 10). Therefore, the terminal pins 50 are not pulled off the holder 60 due to fitting-to and pulling-off operations of the connector.

In the state where the holder 60 is attached to the cover body 16, the terminal contact parts 501 of the terminal pins 50 are disposed in parallel to a planer face of the holder 60, i.e., in the direction perpendicular to the impeller shaft 24 and only the connector parts 502 are protruded on an outer side of the case body 10. Therefore, according to this embodiment, a size of the entire flow meter can be made compact.

The holder 60 can be easily detached from the cover body 16 by means of that engagement of the pawl part of the second holder holding part 172 with the engaging hole 622 is released by pushing up the pawl part and the holder 60 is turned with the support shaft 621 which is engaged with the first holder holding part 171 as a supporting point. Therefore, the detecting part 40 which is sandwiched between the holder 60 and the case body 10 (cover body 16) is easily detached. Accordingly, for example, even when leakage of fluid (beverages) occurs from portions such as the inflow port 25 and the outflow port 26 or, even when a failure occurs in the detecting part 40 due to dew condensation, the detecting part 40 is easily replaced with new one. Therefore, when a failure occurs only in the detecting part 40, the entire flow meter is not required to replace.

Further, the inflow port 25 and the outflow port 26 provided in the case body 10 are provided on a face of the case body 10 which is different from the face where holder 60 is attached. Therefore the inflow port 25 and the outflow port 26 do not interrupt attachment and detachment of the holder 60 and thus maintenance of the flow meter 1 can be performed speedily.

In addition, assembling of the detecting part 40 and the terminal pins 50, and electrical connection of the detecting parts 40 and the terminal pins 50 are attained by utilizing the above-mentioned holder 60 and thus, working such as soldering or fixing with a screw is not required for assembling. Further, when the detecting part 40 is to be replaced, a tool such as a soldering iron or a screwdriver is not required.

Further, the connector parts 502 of the terminal pins 50 are located at a position nearer to the support shaft 621 than the engaging hole 622. In this embodiment, a distance between the connector parts 502 and the support shaft 621 as a rotation center axis (difference of heights in FIG. 3, the same below) is set to be 5.0 mm, and a distance between the connector parts 502 and the engaging hole 622 is set to be 18.5 mm. As described above, when the connector parts 502 are located on the support shaft 621 side where a fixing force of the holder 60 to the case body 10 (cover body 16) is larger, the holder 60 is prevented from being damaged by a load which is applied to the terminal pins 50 (connector parts 502) at the time of fitting-to and pulling-off or the like of the connector.

In addition, the pressing point 503 of the terminal contact part 501 which is pressed against the detecting terminal 401 is located at a position which is nearer to the support shaft 621 than the engaging hole 622. In this embodiment, a distance between the pressing point 503 and the support shaft 621 is set to be 5.5 mm and a distance between the pressing point 503 and the engaging hole 622 is set to be 18 mm. According to the structure as described above, since rattling on a side of the support shaft 621 as a supporting point for attaching and detaching the holder 60 is smaller when the holder 60 is attached, rattling of the terminal contact parts 501 which are sandwiched between the holder 60 and the case body 10 (cover body 16) is further made smaller.

Figure 4A:
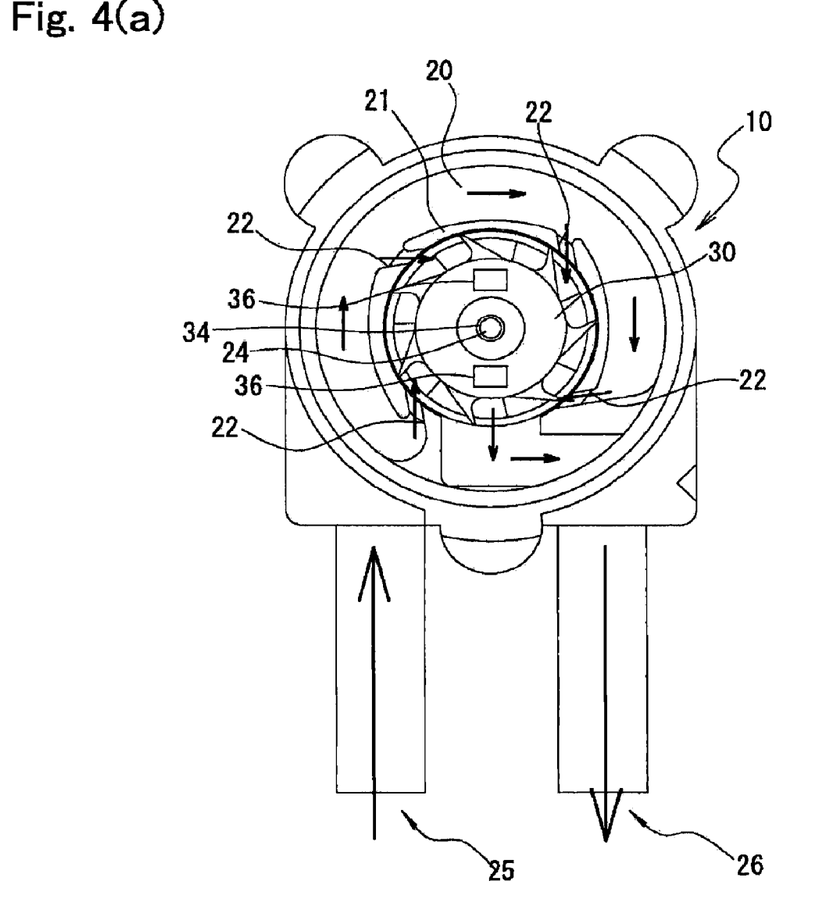
FIG. 4(a) is a plan view schematically showing flow of fluid in a fluid space in a state where a cover body is detached from the flow meter shown in FIG. 1.

Next, an operation of the flow meter 1 will be described below. FIG. 4(a) is a plan view schematically showing flow of fluid in the fluid space 12 in a state where the cover body 16 is detached from the flow meter 1.

Fluid (beverage) which is an object to be measured flows into the fluid space 12 from the inflow port 25. The fluid which has been flowed into the fluid space 12 flows through the flow passage 20 in the fluid space 12 and enters to the impeller 30 through respective inflow passages 22 which are formed in the partition wall 21 with a substantially equal interval in the circumferential direction to rotate the impeller 30 by the fluid pressure. In other words, a rotational speed of the impeller 30 increases as the flow quantity of the fluid is increased and thus there is a correlation between the rotational speed of the impeller 30 and the flow quantity of the fluid (for example, linear relationship).

As described above, the inflow passages 22 are formed so that an angle to an adjacent inflow passage 22 is set to be 180 degrees or less. According to this structure, a load that the impeller 30 receives from the fluid entering through the inflow passages 22 is restrained and thus damage and abrasion of the impeller 30 are prevented and a long life time of the impeller 30 is attained.

Figure 4B:
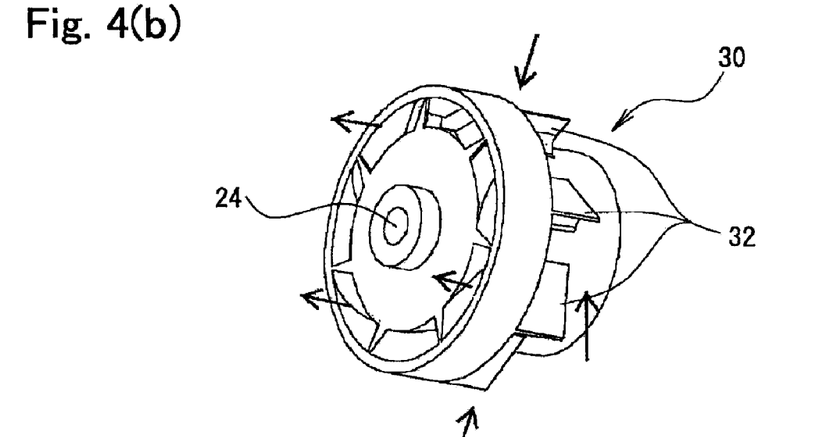
FIG. 4(b) is a perspective view schematically showing flow of the fluid in the impeller.

As shown in FIG. 40) which is the enlarged view showing the impeller 30 where flow of the fluid through the impeller 30 is schematically shown, the fluid which is flowed to the impeller 30 is flowed out in a direction of the impeller shaft 24 (case main body 14 side). The impeller 30 is rotated in a state that it is urged toward the cover body 16 side by an out-flowing pressure of the fluid. In this manner, rattling in the direction of the impeller shaft 24 of the impeller 30 is prevented. Further, since the impeller is urged toward the detecting part 40 for detecting the detected part 36, a detecting state of the detected part 36 which is integrally provided in the impeller 30 is stable.

A rotational speed of the impeller 30 is calculated on the basis of that how many times the detecting part 40 detects the detected part 36 during a predetermined time period. Whenever the detecting part 40 detects the detected part 36, the detecting part 40 outputs an electric signal to a control section (not shown) for the flow meter 1 through the terminal pins 50. In this embodiment, since two detected parts 36 are provided in the impeller 30, when the detecting part 40 detects the detected part 36 two times, the impeller 30 has turned one revolution. On the basis of the rotational speed obtained as described above, flow quantity passing through the fluid space 12 of the flow meter 1 is calculated in the control section for the flow meter 1.

Figure 5:
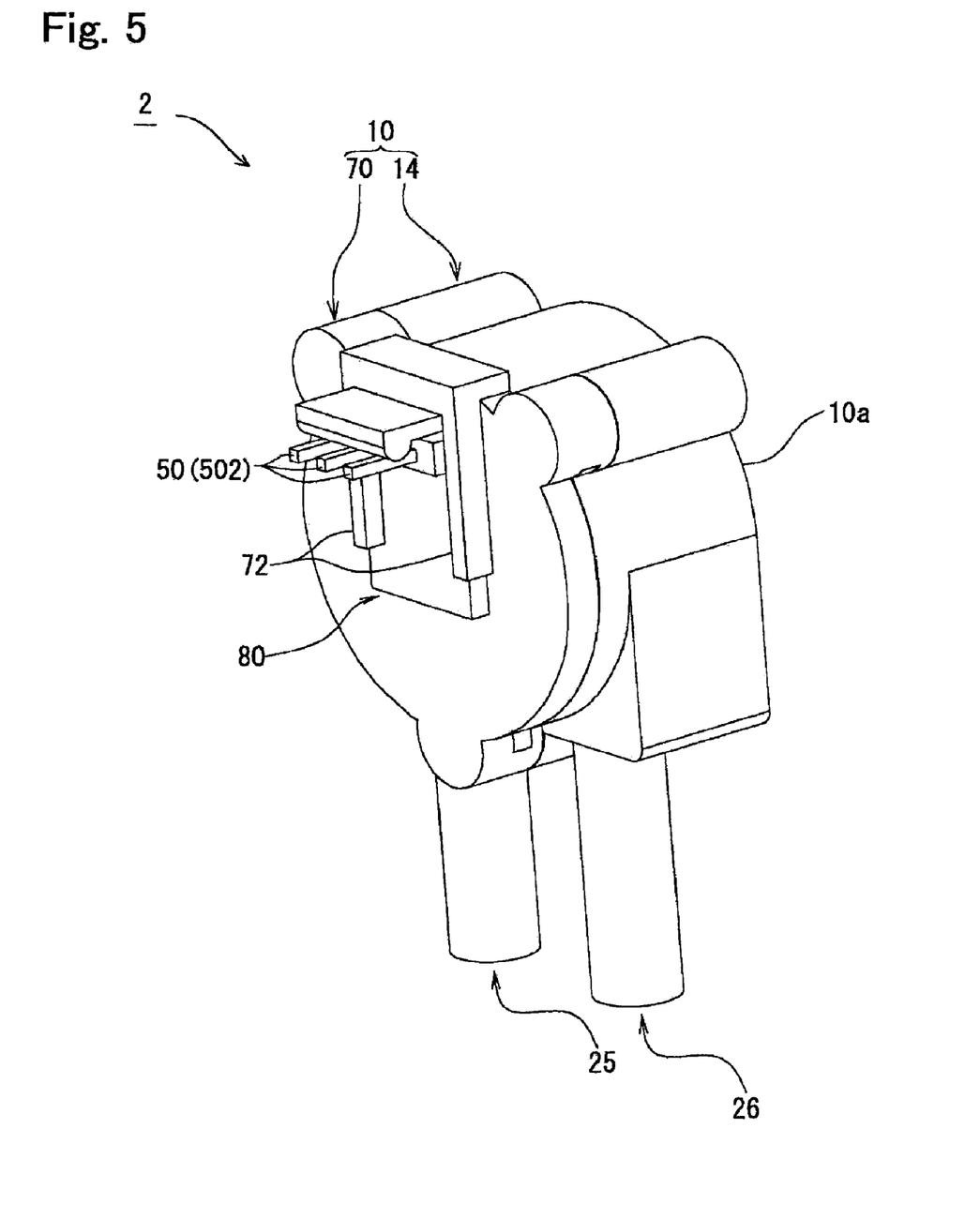
FIG. 5 is an appearance perspective view showing a flow meter in accordance with a second embodiment of the present invention.

Next, a flow meter 2 in accordance with a second embodiment of the present invention will be described below. FIG. 5 is an appearance perspective view showing the flow meter 2. The flow meter 2 is different from the flow meter 1 in accordance with the first embodiment in a mounting structure on the holder 80. Therefore, the structure of the flow meter 2 is the same as the first embodiment except the structure of a cover body 70 and a holder 80 and thus description of the same structure is omitted.

As shown in FIG. 5, guide rails 72 are formed on the cover body 70 to which the holder 80 is attached so as to extend along a surface of the cover body 70 in a direction of the terminal contact parts 501. When both side ends of the holder 80 are engaged with the guide rails 72 and the holder 80 is made slide upward in FIG. 5, the holder 80 is attached to the cover body 70 (case body 10). In this state, similarly to the first embodiment, the terminal contact parts 501 and the detecting terminals 402 are faced each other in the axial direction of the impeller shaft 24 and pressure-contacted with each other. Further, similarly to the first embodiment, the holder 80 is fixed with the terminal pins 50 and the connector parts 502 are protruded outside.

According to the structure as described above, the holder 80 is attached to the cover body 70 (case body 10) by sliding and thus mounting work of the holder 80 is easy. Further, when the holder 80 is made slide, the terminal contact part 501 of the terminal pin 50 fixed in the holder 80 is scraped against the detecting terminal 402. Therefore, metal films of the terminal contact part 501 and the detecting terminal 402 can be removed, their electric conduction state becomes satisfactory.

Although the present invention has been shown and described with reference to a specific embodiment, various changes and modifications will be apparent to those skilled in the art from the teachings herein.

For example, the flow meter in accordance with the embodiment described above is used for measuring flow quantity of beverage but may be used for measuring flow quantity of another liquid or gas. Further, the inflow port 25 and the outflow port 26 are formed in one side face of the case main body 14 (face to which the cover body 16 is not placed) and thus the inflow port 25 and the outflow port 26 do not interrupt detaching operation of the cover body 16. Therefore, especially, the present invention may be preferably used in an application for beverage which is required to regularly disassemble and wash the impeller 30 and the like, for example, in an application for measurement of flow quantity of liquid used for pharmaceutical products or cosmetics.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A flow meter comprising:
   a case body which is formed with a fluid space in an inside of the case body;
   an impeller which is disposed in the fluid space and whose rotation number is varied according to flow quantity of fluid flowing through the fluid space;
   a detected part which is integrally provided in the in impeller;
   a detecting part which is provided with detecting terminals structured to detect the detected part to convert rotation of the impeller into an electric signal;
   terminal pins which is provided with terminal contact parts, which are electrically connected with the detecting terminals of the detecting part, and connector parts with which a connector structured to output the electric signal converted by the detecting part to an outside is connected; and a holder to which the terminal pins are fixed and which is detachably held by the case body through a holder holding part provided in the case body;

wherein the detecting part and the terminal contact parts are held between the case body and the holder by attaching the holder to the case body so that the terminal contact parts are contacted with the detecting terminals.

2. The flow meter according to claim 1, wherein the terminal contact part and the detecting terminal are respectively formed in a shape extending in a longitudinal direction, and side faces in the longitudinal direction of the terminal contact part and the detecting terminal are abutted with each other.

3. The flow meter according to claim 2, wherein the side faces in the longitudinal direction of the terminal contact part and the detecting terminal are faced and abutted with each other in an axial direction of the impeller.

4. The flow meter according to claim 3, wherein the terminal pin is structured so that the connector part and the terminal contact part are connected to each other at a substantially right angle, and the connector part is penetrated through the holder.

5. The flow meter according to claim 3, further comprising an inflow port which is provided in the case body and through which the fluid is flowed into the fluid space in the case body, and an outflow port which is provided in the case body and through which the fluid is flowed out from the fluid space, wherein the holder holding part is provided on a face which is different from a face where the inflow port and the outflow port are provided.

6. The flow meter according to claim 3, wherein when the holder is attached to the cover body, the terminal contact part of the terminal pin which is fixed to the holder is pressed against the detecting terminal of the detecting part, and the terminal contact part and the detecting terminal are held between a side face of the case body and a side face of the holder so that the side faces in the longitudinal direction of the terminal contact part and the detecting terminal are faced and abutted with each other.

7. The flow meter according to claim 6, wherein the holder holding part comprises a first holder holding part and a second holder holding part, and the holder is provided with a support part which is turnably supported by the first holder holding part and an engaging part which is engaged with the second holder holding part.

8. The flow meter according to claim 7, wherein the connector part is located at a position which is nearer to the support part than the engaging part.

9. The flow meter according to claim 7, wherein the terminal contact part is located at a position which is nearer to the support part than the engaging part.

10. The flow meter according to claim 9, wherein the connector part is located at a position which is nearer to the support part than the engaging part.

11. The flow meter according to claim 10, wherein the detecting terminal is urged toward the terminal contact part by an urging member which is disposed in the case body, and the detecting terminal is engaged with a groove part which is provided on at least one of the case body and the urging member disposed in the case body.

12. The flow meter according to claim 10, wherein the terminal contact part is urged toward the detecting terminal by an urging member which is disposed in the holder, and the terminal contact part is engaged with a groove part which is provided on at least one of the holder and the urging member disposed in the holder.

13. The flow meter according to claim 3, further comprising a guide rail with which the holder is engaged and which is formed on the case body in the longitudinal direction of the terminal contact part and the detecting terminal that are abutted with each other, wherein side faces in the longitudinal direction of the terminal contact part and the detecting terminal are faced and abutted with each other by attaching the holder to the case body along the guide rail.

14. The flow meter according to claim 1, wherein the detecting terminal is urged toward the terminal contact part by an urging member which is provided on the case body.

15. The flow meter according to claim 14, wherein the detecting terminal is engaged with a groove part which is provided on at least one of the case body and the urging member disposed on the case body.

16. The flow meter according to claim 1, wherein the terminal contact part is urged toward the detecting terminal by an urging member which is disposed on the holder.

17. The flow meter according to claim 16, wherein the terminal contact part is engaged with a groove part which is provided on at least one of the holder and the urging member disposed on the holder.

18. The flow meter according to claim 1, wherein the detected part comprises a magnet and the detecting part comprises a Hall IC.

19. The flow meter according to claim 1, further comprising a plurality of inflow passages which is formed in the fluid space and structured to guide the fluid to the impeller, wherein an angle between one of the inflow passages and an adjacent inflow passage is 180 degrees or less.

20. The flow meter according to claim 19, wherein the impeller makes the fluid which is flowed from the inflow passage flow out in a direction of a rotational axis of the impeller.

* * * * *